(12) United States Patent
Shi et al.

(10) Patent No.: US 9,752,603 B2
(45) Date of Patent: Sep. 5, 2017

(54) ACCESS TERMINAL BOX (71) Applicant: Huawei Technologies Co., Ltd., Shenzhen (CN)

(72) Inventors: Deyi Shi, Shenzhen (CN); Yeren Wang, Shenzhen (CN); Anliang Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/083,837

(22) Filed: Mar. 29, 2016

(65) Prior Publication Data
US 2016/0327764 A1 Nov. 10, 2016

Related U.S. Application Data (63) Continuation of application No. PCT/CN2015/078565, filed on May 8, 2015.

(51) Int. Cl.
| | |
|---|---|
| *F16B 2/12* | (2006.01) |
| *F16B 2/18* | (2006.01) |
| *G02B 6/44* | (2006.01) |
| *H01R 9/26* | (2006.01) |
| *H02B 1/052* | (2006.01) |

(52) U.S. Cl.
CPC ............... *F16B 2/12* (2013.01); *F16B 2/185* (2013.01); *G02B 6/4446* (2013.01); *H01R 9/2608* (2013.01); *H02B 1/0523* (2013.01)

(58) Field of Classification Search
CPC .................................. G02B 6/44; G02B 6/18
USPC ......................................................... 385/135
See application file for complete search history.

(56) References Cited

U.S. PATENT DOCUMENTS

| | | | | |
|---|---|---|---|---|
| 5,097,529 | A * | 3/1992 | Cobb et al. | 385/135 |
| 5,886,295 | A * | 3/1999 | Carino et al. | 174/481 |
| 7,674,129 | B1 | 3/2010 | Liu | |
| 8,325,491 | B2 | 12/2012 | Hecht et al. | |
| 9,004,945 | B2 * | 4/2015 | Nagata et al. | 385/135 |
| 9,166,387 | B2 * | 10/2015 | Murakoshi et al. | 385/135 |
| 2006/0175489 | A1 | 8/2006 | Portal | |

(Continued)

FOREIGN PATENT DOCUMENTS

| | | |
|---|---|---|
| CN | 1808773 A | 7/2006 |
| CN | 101523675 A | 9/2009 |

(Continued)

OTHER PUBLICATIONS

Partial English Translation and Abstract of Chinese Patent Application No. CN204119268, Mar. 14, 2016, 3 pages.

(Continued)

*Primary Examiner* — Kaveh C Kianni
(74) *Attorney, Agent, or Firm* — Conley Rose, P.C.

(57) ABSTRACT

An access terminal box includes a base plate, wherein a first fastening part, a second fastening part, and a fastening lever that are configured to fasten the access terminal box to a mounting plate disposed on the base plate, a through hole is disposed on the second fastening part, the fastening lever includes a head part, a body part, and an elastic part, the head part is connected to the body part, one end of the elastic part is connected to the head part, the body part and the elastic part are located inside the through hole, and the head part is exposed at a first outlet of the through hole.

11 Claims, 9 Drawing Sheets

(56) References Cited

U.S. PATENT DOCUMENTS

2008/0108248 A1 5/2008 Lim et al.
2009/0286422 A1 11/2009 Henkel et al.
2011/0019964 A1* 1/2011 Nhep et al. .................. 385/135

FOREIGN PATENT DOCUMENTS

| CN | 101730962 A | 6/2010 |
|---|---|---|
| CN | 202190484 U | 4/2012 |
| CN | 204119268 U | 1/2015 |
| DE | 3014499 A1 | 10/1981 |
| DE | 102013103544 A1 | 10/2014 |
| EP | 2020718 A1 | 2/2009 |
| EP | 2498353 A1 | 9/2012 |

OTHER PUBLICATIONS

Foreign Communication From A Counterpart Application, PCT Application No. PCT/CN2015/078565, International Search Report dated Feb. 16, 2016, 8 pages.
Foreign Communication From A Counterpart Application, PCT Application No. PCT/CN2015/078565, Written Opinion dated Feb. 16, 2016, 3 pages.
Foreign Communication From A Counterpart Application, European Application No. 15804667.2, Extended European Search Report dated Mar. 6, 2017, 6 pages.

\* cited by examiner

ACCESS TERMINAL BOX

CROSS-REFERENCE TO RELATED APPLICATIONS

This application is a continuation of International Application No. PCT/CN2015/078565, filed on May 8, 2015, which is hereby incorporated by reference in its entirety.

TECHNICAL FIELD

The present invention relates to the field of communications technologies, and in particular, to an access terminal box.

BACKGROUND

Because fiber optic communications has advantages such as a large capacity, a long distance, and anti-electromagnetic interference, the fiber optic communications better caters to people's requirements for a large information amount and high precision in the future, and a low price makes a transmission medium of fiber be promoted in a quite large scope. Currently, a fiber network is already gradually being used in home. Mounting of fiber to the home generally includes mounting of an access terminal box (ATB) and mounting of an optical network terminal (ONT). The access terminal box and the optical network terminal are indoor application products of a user on an optical network, and the access terminal box and the optical network terminal are connected by using a leading-out optical cable of the access terminal box. Because mounting of fiber to the home needs to be performed inside a house of the user, a simplified mounting method is required to implement popularization of fiber to the home.

Figure 1:
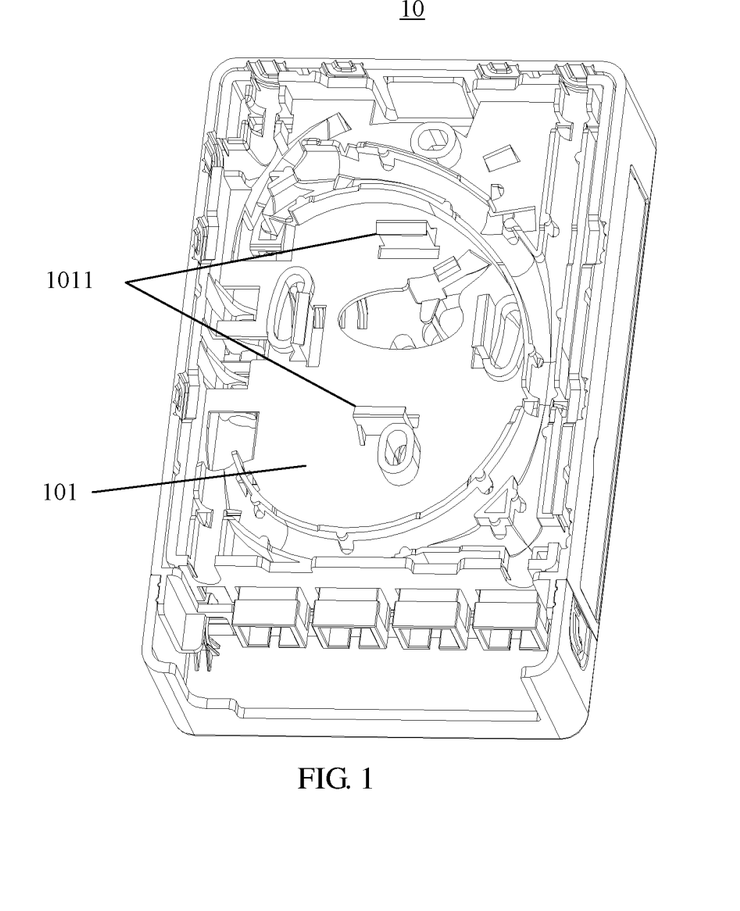
FIG. 1 is a schematic diagram of a three-dimensional structure of an access terminal box in the prior art.
Figure 2:
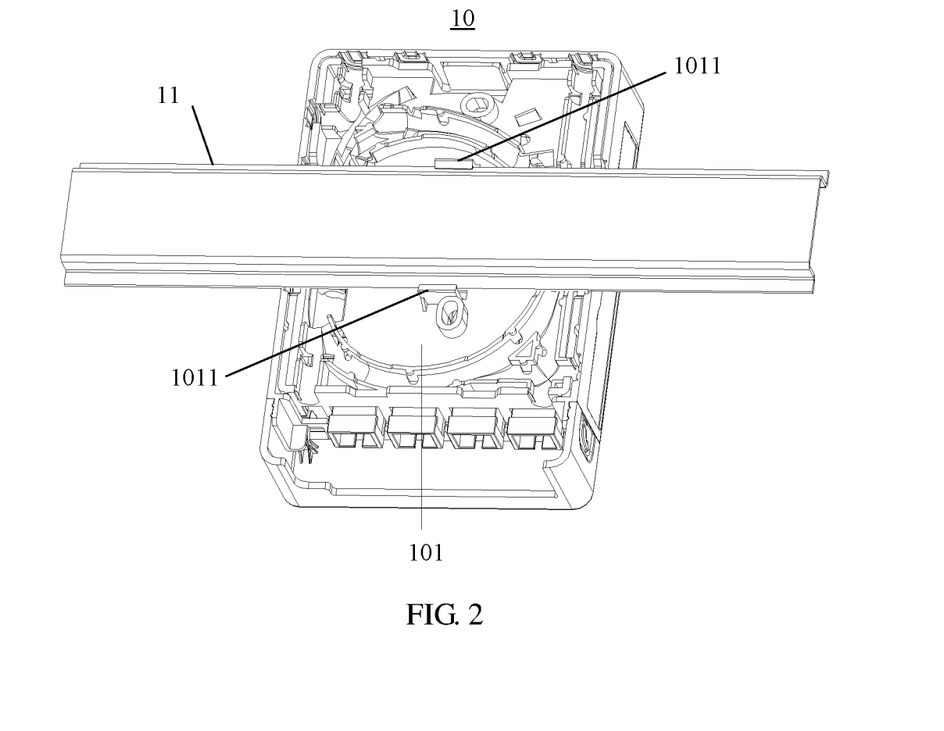
FIG. 2 is a schematic structural diagram formed when an access terminal box is fastened to a mounting plate in the prior art.
Figure 3:
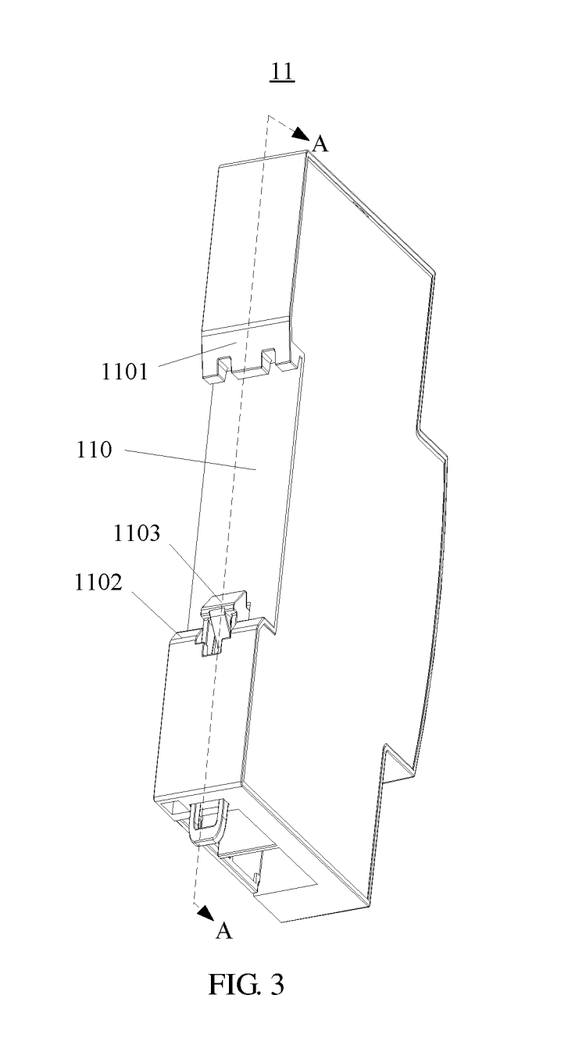
FIG. 3 is a schematic diagram of a three-dimensional structure of an access terminal box according to an embodiment of the present disclosure.
Figure 4:
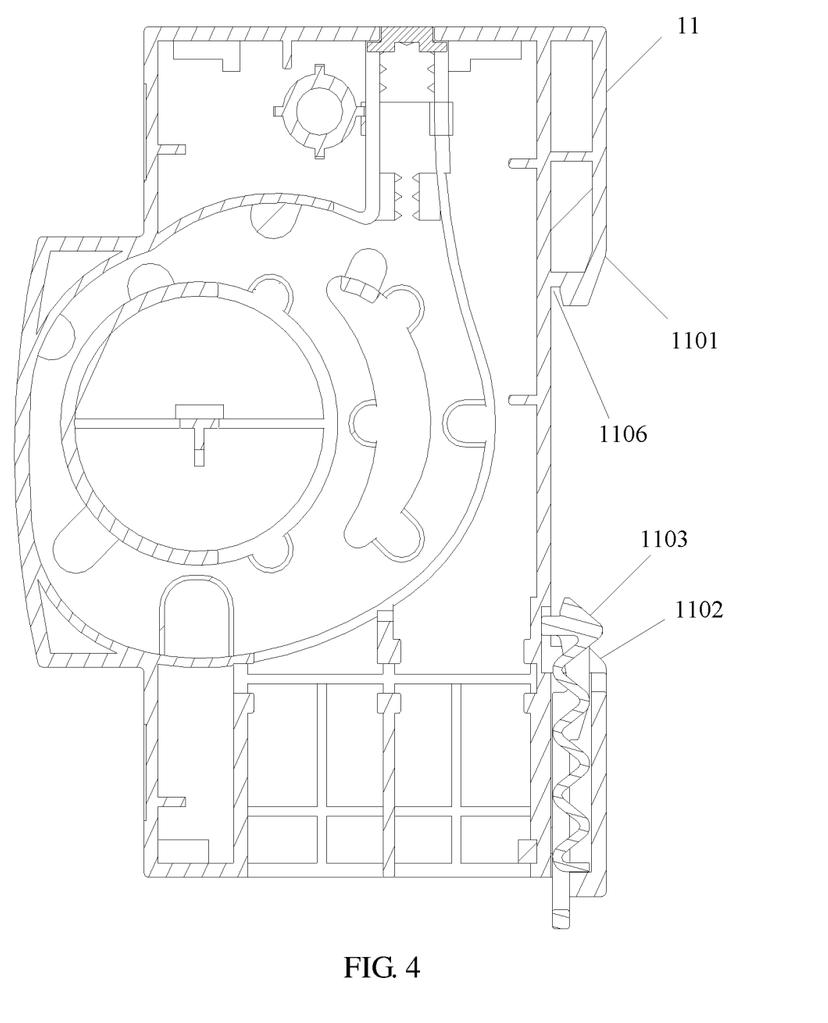
FIG. 4 is a cross-sectional view of the access terminal box shown in FIG. 3 along an A-A line.
Figure 5:
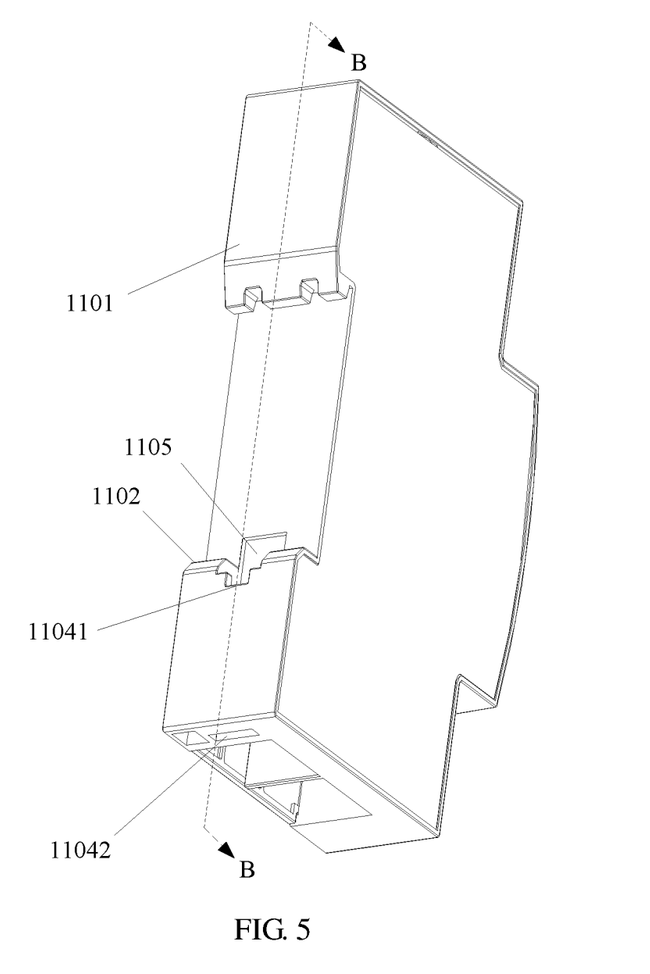
FIG. 5 is a schematic diagram of a three-dimensional structure of an access terminal box (excluding a fastening lever) according to an embodiment of the present disclosure.
Figure 6:
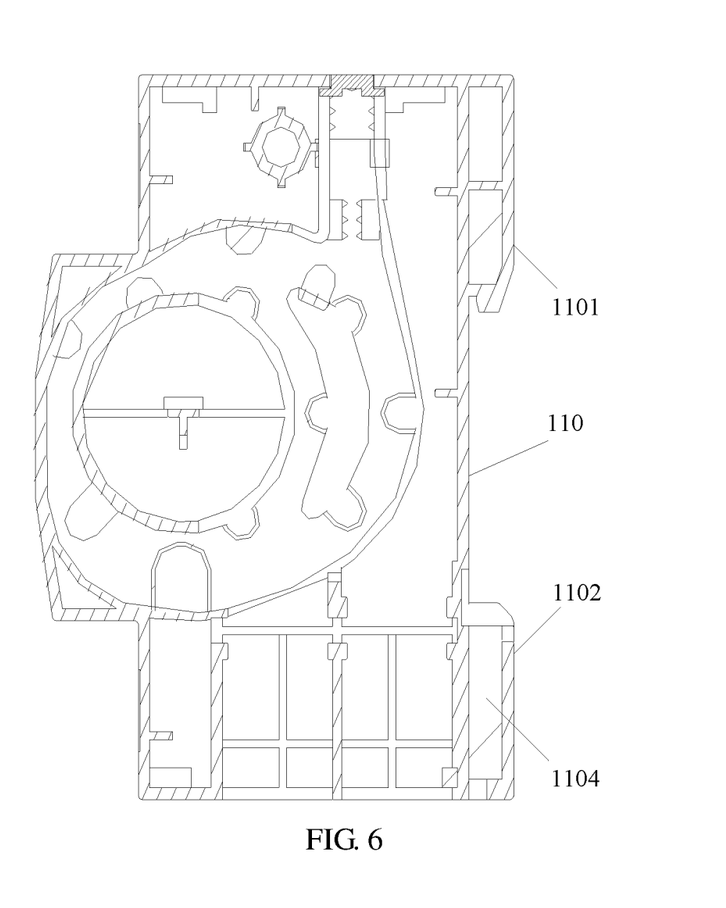
FIG. 6 is a cross-sectional view of the access terminal box in FIG. 5 along an B-B line.

Referring to FIG. 1 and FIG. 2, an existing access terminal box 10 includes a base plate 101, where the base plate 101 is generally mounted on a mounting plate 11 by using a fastened buckling hook 1011. Because the buckling hook 1011 that fastens the mounting plate 11 has poor elasticity, there is a problem that mounting and detachment of the access terminal box 10 are difficult, and in a severe case, the buckling hook 1011 may be even broken and damaged, which causes the entire access terminal box 10 to be scrapped.

SUMMARY

Embodiments of the present disclosure provide an access terminal box, where a first fastening part, a second fastening part, and a fastening lever are disposed on a base plate, so that the access terminal box is easily mounted on and detached from a mounting plate, which resolves a problem that mounting and detachment of the access terminal box are difficult.

A first aspect of an embodiment of the present disclosure provides an access terminal box, including a base plate, where a first fastening part, a second fastening part, and a fastening lever that are configured to fasten the access terminal box to a mounting plate are disposed on the base plate, a through hole is disposed on the second fastening part, the fastening lever includes a head part, a body part, and an elastic part, the head part is connected to the body part in a fastened manner, one end of the elastic part is connected to the head part in a fastened manner, the body part and the elastic part are located inside the through hole, and the head part is exposed at a first outlet of the through hole.

With reference to the first aspect, in a first possible implementation manner of the first aspect, the body part is a U-shaped frame, and the elastic part is located inside the U-shaped frame.

With reference to the first possible implementation manner of the first aspect, in a second possible implementation manner of the first aspect, a section of the elastic part is wavy.

With reference to the second possible implementation manner of the first aspect, in a third possible implementation manner of the first aspect, a support part configured to support the mounting plate is disposed on the head part.

With reference to the third possible implementation manner of the first aspect, in a fourth possible implementation manner of the first aspect, a top of the support part protrudes from a plane on which the body part is located.

With reference to the third possible implementation manner of the first aspect, in a fifth possible implementation manner of the first aspect, a first groove configured to limit an activity area of the support part is disposed on the base plate.

With reference to the first aspect, in a sixth possible implementation manner of the first aspect, a guide rail part is further disposed on the head part, the guide rail part includes a first inclined plane, and the first inclined plane is located on an outer side of the guide rail part and is configured to facilitate mounting of the access terminal box on the mounting plate.

With reference to the sixth possible implementation manner of the first aspect, in a seventh possible implementation manner of the first aspect, the guide rail part further includes a second inclined plane, and the second inclined plane is configured to facilitate detachment of the access terminal box from the mounting plate.

With reference to the third possible implementation manner of the first aspect, in an eighth possible implementation manner of the first aspect, a distance between a bottom of the first fastening part and a top of the second fastening part is greater than a width of the mounting plate, and the mounting plate is placed between the bottom of the first fastening part and the support part.

With reference to the first aspect, in a ninth possible implementation manner of the first aspect, the U-shaped frame is exposed at a second outlet of the through hole.

With reference to the first aspect, in a tenth possible implementation manner of the first aspect, a second groove is disposed on the first fastening part, and the second groove is configured to fasten an edge of the mounting plate.

In the embodiments of the present disclosure, a first fastening part and a second fastening part that are configured to fasten an access terminal box to a mounting plate are disposed on an outer wall of a base plate, a fastening lever is disposed on the second fastening part, and the mounting plate is placed between the first fastening part and the second fastening part and is fastened by using the fastening lever, so that an access terminal box is easily mounted on and detached from the mounting plate, which resolves a problem that mounting and detachment of the access terminal box are difficult.

DETAILED DESCRIPTION

To make the objectives, technical solutions, and advantages of the embodiments of the present disclosure clearer, the following clearly describes the technical solutions of the embodiments of the present disclosure with reference to the accompanying drawings in the embodiments of the present disclosure.

Figure 7:
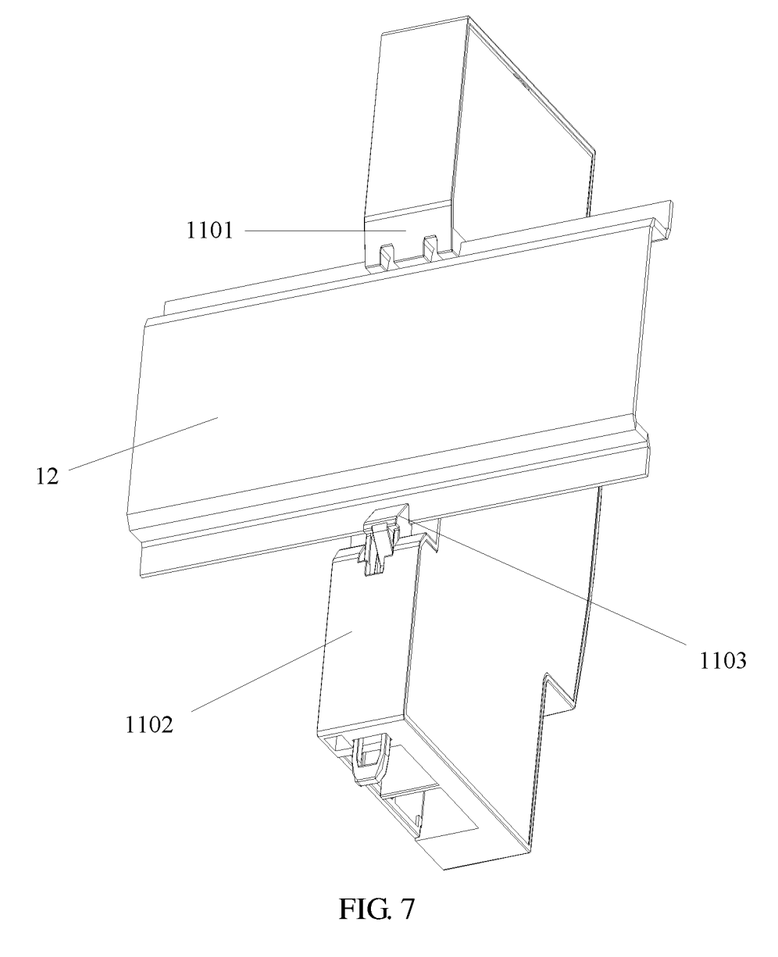
FIG. 7 is a schematic diagram of a three-dimensional structure formed when an access terminal box is fastened to a mounting plate according to an embodiment of the present disclosure.
Figure 8:
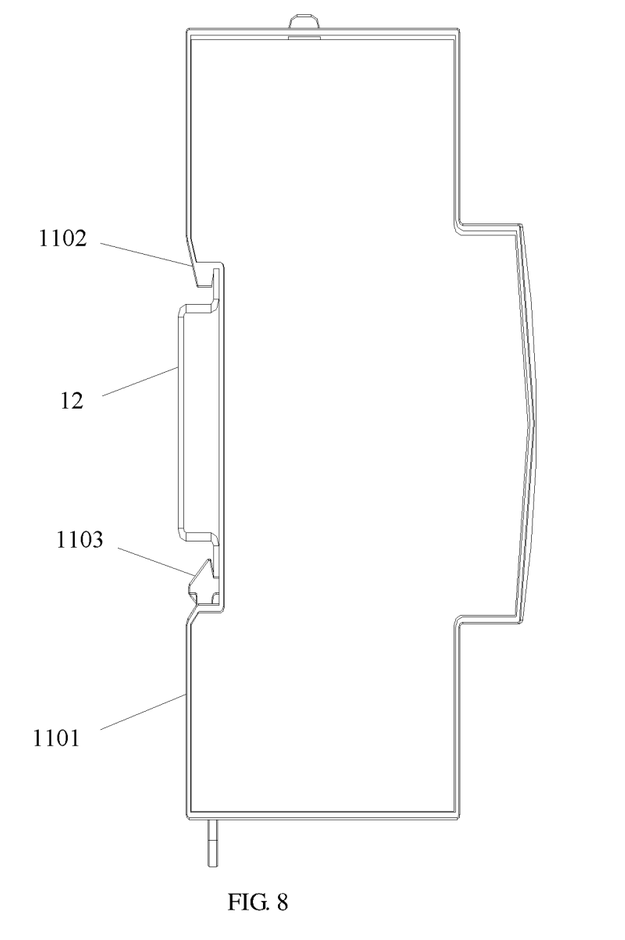
FIG. 8 is a side view of the access terminal box shown in FIG. 7.

Referring to FIG. 3, FIG. 4, FIG. 5, and FIG. 6, an access terminal box 11 includes a base plate 110, where a first fastening part 1101, a second fastening part 1102, and a fastening lever 1103 that are configured to fasten the access terminal box 11 to a mounting plate 12 (shown in FIGS. 7-8) are disposed on the base plate 110. A through hole 1104 is disposed on the second fastening part 1102, and the fastening lever 1103 is located inside the through hole 1104. As shown in FIG. 7 and FIG. 8, the access terminal box 11 is fastened to the mounting plate 12 by using the first fastening part 1101 and the second fastening part 1102, and the access terminal box 11 is further fastened to the mounting plate 12 by using the fastening lever 1103.

Figure 9:
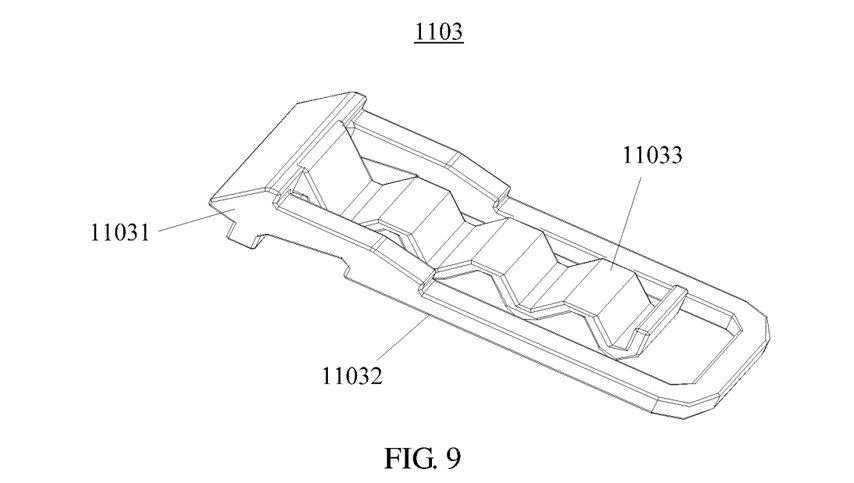
FIG. 9 is a schematic diagram of a three-dimensional structure of a fastening lever according to an embodiment of the present disclosure.
Figure 10:
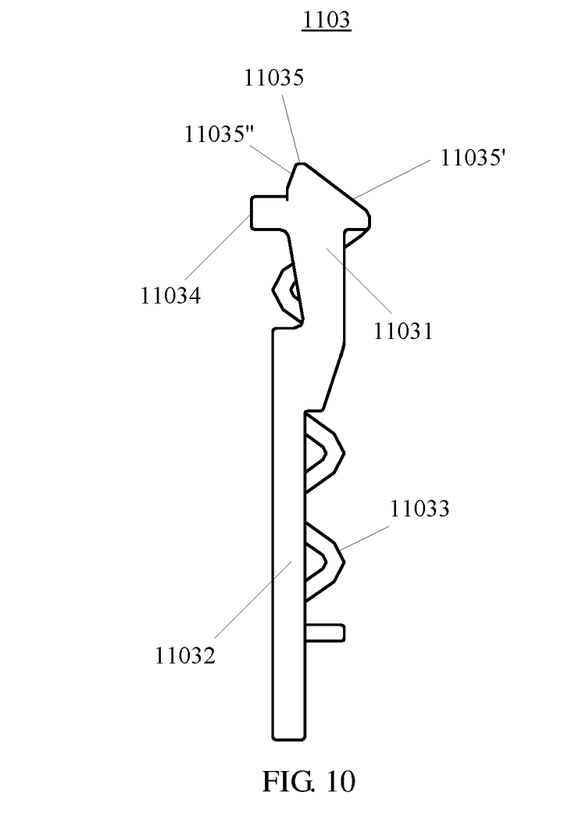
FIG. 10 is a side view of the fastening lever shown in FIG. 9.

As shown in FIG. 9 and FIG. 10, the fastening lever 1103 includes a head part 11031, a body part 11032, and an elastic part 11033. The head part 11031 is connected to the body part 11032 in a fastened manner. One end of the elastic part 11033 is connected to the head part 11031 in a fastened manner. The body part 11032 and the elastic part 11033 are located inside the through hole 1104, and the head part 11031 is exposed at a first outlet 11041 (shown in FIG. 5) of the through hole 1104.

As shown in FIG. 9, the body part 11032 of the fastening lever 1103 is a U-shaped frame, and the elastic part 11033 is located inside the frame. In an embodiment, a section of the elastic part 11033 is wavy. When the fastening lever 1103 is fastened inside the through hole 1104 of the second fastening part 1102, the through hole 1104 squeezes the wavy elastic part 11033 to some extent, so that the elastic part 11033 extends, and there is particular frictional resistance between the fastening lever 1103 and the through hole 1104. Therefore, the fastening lever 1103 may not easily slide inside the through hole 1104 of the second fastening part 1102 and may not be easily separated from the second fastening part 1102 either. In this embodiment, the frame is exposed at a second outlet 11042 (shown in FIG. 5) of the through hole 1104, which facilitates pulling of the fastening lever 1103, so that the fastening lever 1103 moves inside the through hole 1104.

In this embodiment, a support part 11034 (shown in FIG. 10) configured to support the mounting plate 12 is disposed on the head part 11031 of the fastening lever 1103, and a top of the support part 11034 protrudes from a plane on which the body part 11032 is located. Preferably, the support part 11034 is perpendicular to the body part 11032 of the fastening lever 1103.

Further, a first groove 1105 (shown in FIG. 5) is configured to limit an activity area of the support part 11034 disposed on the base plate 110. The first groove 1105 limits the activity area of the support part 11034, so as to limit an activity area of the fastening lever 1103. In an embodiment, the first groove 1105 is a dented rectangular area, and the support part 11034 moves in the dented rectangular area. The top of the support part 11034 protrudes from the plane on which the body part 11032 of the fastening lever 1103 is located. When the fastening lever 1103 is mounted inside the through hole 1104, the top of the support part 11034 is stuck inside the first groove 1105. Thus, the fastening lever 1103 may not be randomly separated from the second fastening part 1102 at the first outlet 11041 of the through hole 1104.

To facilitate mounting of the access terminal box on the mounting plate 12, a guide rail part 11035 is further disposed on the head part 11031. The guide rail part 11035 includes a first inclined plane 11035'. The first inclined plane 11035' is located on an outer side of the guide rail part 11035. The outer side herein refers to a side on which the head part 11031 is far away from the base plate 110.

Further, to facilitate detachment of the access terminal box from the mounting plate 12, the guide rail part 11035 further includes a second inclined plane 11035". The second inclined plane 11035" is located on an inner side of the guide rail part 11035. The inner side herein refers to a side on which the head part 11031 is close to the base plate 110.

To make the fastening firmer, a second groove 1106 (shown in FIG. 4) is disposed on the first fastening part 1101. The second groove 1106 is configured to fasten the mounting plate 12.

When the access terminal box 10 is being fastened to the mounting plate 12, one side of the mounting plate 12 is stuck by the second groove 1106, and the other side of the mounting plate 12 applies force on the second inclined plane 11035". Thus, the fastening lever 1103 moves downwards until the mounting plate 12 passes through the head part 11031, and then the fastening lever 1103 loses the force and moves upwards until the support part 11034 supports the mounting plate 12. In this embodiment, when the access terminal box 10 is being detached from the mounting plate 12, the access terminal box 10 is pushed to move upwards. Due to force applied on the support part 11032 by the mounting plate 12, the fastening lever 1103 moves downwards, so that one side of the mounting plate 12 is separated from the second groove 1106, and the access terminal box 10 is detached.

It should be noted that the elastic part 11033 may further be a spring, and one end of the spring is connected to the head part 11031 in a fastened manner. When the fastening lever 1103 is fastened inside the through hole 1104 of the second fastening part 1102, the other end of the spring is in contact with an inner wall of the second fastening part 1102.

It should be noted that the fastening lever 1103 may also be disposed on the first fastening part 1101, or the fastening lever 1103 may be disposed on both the first fastening part 1101 and the second fastening part 1102.

The foregoing descriptions are merely exemplary implementation embodiments of the present disclosure, but are not intended to limit the protection scope of the present disclosure. It should be noted that a person of ordinary skill in the art may make some improvements and polishing without departing from the principle of the present disclosure and the improvements and polishing shall fall within the protection scope of the present disclosure.

What is claimed is:

1. An access terminal box, comprising:
   a base plate;
   a first fastening part;
   a fastening lever;
   a second fastening part; and
   a mounting plate disposed on the base plate,
   wherein the first fastening part, the second fastening part, and the fastening lever are configured to fasten the access terminal box to the mounting plate,
   wherein a through hole is disposed on the second fastening part,
   wherein the fastening lever comprises:
      a head part;
      a body part; and
      an elastic part,
   wherein the head part is connected to the body part,
   wherein one end of the elastic part is fastened to the head part,
   wherein the body part and the elastic part are located inside the through hole, and
   wherein the head part is exposed at a first outlet of the through hole.

2. The access terminal box according to claim 1, wherein the body part of the fastening lever is a U-shaped frame, and wherein the elastic part is located inside the U-shaped frame.

3. The access terminal box according to claim 2, wherein a section of the elastic part is wavy.

4. The access terminal box according to claim 1, wherein the fastening lever further comprises a support part disposed on the head part and configured to support the mounting plate.

5. The access terminal box according to claim 4, wherein a top of the support part protrudes from a plane on which the body part is located.

6. The access terminal box according to claim 4, further comprising a first groove disposed on the base plate and configured to limit an activity area of the support part.

7. The access terminal box according to claim 1, wherein the fastening lever further comprises a guide rail part disposed on the head part, wherein the guide rail part comprises a first inclined plane located on an outer side of the guide rail part, and wherein the first inclined plane is configured to facilitate mounting of the access terminal box on the mounting plate.

8. The access terminal box according to claim 7, wherein the guide rail part further comprises a second inclined plane configured to facilitate detachment of the access terminal box from the mounting plate.

9. The access terminal box according to claim 4, wherein a distance between a bottom of the first fastening part and a top of the second fastening part is greater than a width of the mounting plate, and wherein the mounting plate is placed between the bottom of the first fastening part and the support part.

10. The access terminal box according to claim 2, wherein the U-shaped frame is exposed at a second outlet of the through hole.

11. The access terminal box according to claim 1, further comprising a groove disposed on the first fastening part, wherein the groove is configured to fasten an edge of the mounting plate.

* * * * *